United States Patent
Katseff et al.

(10) Patent No.: US 6,301,258 B1
(45) Date of Patent: *Oct. 9, 2001

(54) LOW-LATENCY BUFFERING FOR PACKET TELEPHONY

(75) Inventors: Howard Paul Katseff, Englishtown; Robert Patrick Lyons, Jackson; Bethany Scott Robinson, Lebanon, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,229

(22) Filed: Dec. 4, 1997

(51) Int. Cl.$^7$ ................................ H04L 12/56; H04J 3/06
(52) U.S. Cl. .......................... 370/412; 370/508; 370/517
(58) Field of Search .................................. 370/465, 468, 370/477, 508, 516–517, 519; 375/371–372

(56) References Cited

U.S. PATENT DOCUMENTS

| | | | |
|---|---|---|---|
| 4,914,650 | * 4/1990 | Sriram | 370/60 |
| 5,109,482 | * 4/1992 | Bohrman | 395/154 |
| 5,159,447 | * 10/1992 | Haskell et al. | 358/133 |
| 5,191,645 | * 3/1993 | Carlucci et al. | 395/159 |
| 5,193,148 | * 3/1993 | Alcorn et al. | 395/157 |
| 5,237,648 | * 8/1993 | Mills et al. | 395/133 |
| 5,287,182 | * 2/1994 | Haskell et al. | 348/500 |
| 5,544,170 | * 8/1996 | Kasahara | 370/84 |
| 5,623,490 | * 4/1997 | Richter et al. | 370/263 |
| 5,822,537 | * 10/1998 | Katseff et al. | 395/200.61 |

FOREIGN PATENT DOCUMENTS

| | | | |
|---|---|---|---|
| 0 271 866 A2 | * 12/1987 | (EP) | 88/25 |
| 0 460 867 A2 | * 5/1991 | (EP) | 91/50 |
| 0 548 597A1 | * 12/1992 | (EP) | 93/26 |

OTHER PUBLICATIONS

Ran et al. "Designing an ON–Demand Multimedia Service" IEEE Communication Magazine v30 iss7, Jul. 1992.*

Megiddo et al. "The Minimum Reservation Rate Problem in Digital Audio/Video", Israel Symposium on Theory of Computing, 1993.*

Revindran et al. "Delay Compensation Protocols for Synchronization of Multimedia Data Streams", IEEE Trans. on Knowledge and Data Engineering, v5 iss4, Aug. 1993.*

(List continued on next page.)

*Primary Examiner*—Huy D. Vu
*Assistant Examiner*—Toan Nguyen
(74) *Attorney, Agent, or Firm*—Kenyon & Kenyon (57) ABSTRACT

In a method for reducing latency in packet telephony caused by anti-jitter buffering, audio data elements are received and placed in a telephony input buffer used for anti-jitter buffering. Rather than wait until the buffer is full, the audio data elements are clocked, or played, out of the buffer at a rate slower than the normal play rate. In this way, latency due to the initial buffer fill period is reduced or eliminated. Audio data elements continue to be played out at a slower than normal rate until the buffer fill level reaches a threshold. At that time, the play rate for sending data elements out of the telephony input buffer is adjusted to the normal play rate. In an alternative embodiment of the present invention, the fill level of the telephony input buffer is controlled within a desired range by speeding up or slowing down the rate at which audio data elements are played out of the telephony input buffer. In yet another alternative embodiment, the amount of latency jitter in the packet network is measured and the size of the telephony input buffer is adjusted based upon the relative amount of jitter, such that the relative size of the buffer is reduced when the packet network is quiet, and the size of the buffer is increased when the network is relatively jittery.

50 Claims, 6 Drawing Sheets

OTHER PUBLICATIONS

Computer Communications, vol. 15, No. 10, Dec. 1, 1992 pp. 611–618, Blakowski G. et al, "Tool Support for the Synchronization and Presentation of Distributed Multimedia".*

IEEE Communications Magazine, vol. 29. No. 10, Oct. 1, 1991, pp. 54–64, Israel Cidon et al, "Bandwidth Management and Congestion Control on plaNet".*

Cherry, Lorinda L. and Waldstein, Robert K., "Electronic Access To Full Document Text And Images Trough Linus", AT&T Technical Journal, Jul./Aug. 1989, pp. 72–90.*

Davcev, Danco, Cakmakov, Dusan and Cabukovski, Vanco, "Distributed Multimedia Information Retrieval System", Computer Communications, vol. 15, No. 3, Apr. 1992, pp. 177–184.*

Haskin, Roger L., "The Shark Continuous–Media File Server", Digest of Papers, COMPCON Spring'93, San Francisco, California, Feb. 22–26, 1993, pp. 12–15.*

Katseff, Howard P. and London, Thomas B., "The Ferret Document Browser", USENIX Summer 1993 Technical Conference, Cincinnati, Jun. 1993.*

Lesk, Michael, "Television Libraries for Workstations: An All–Digital Storage, Transmission and Display for Low–rate Video", (apparently unpublished).*

O'Gorman, Lawrence, "Image and Document Processing Techniques for the RightPages Electronic Library System", Proceedings of the 11$^{th}$ IAPR International Conference on Pattern Recognition, The Hague, Nethlands, Aug. 30–Sep. 3, 1992, vol. II, Conference B: Pattern Recogbition Methodology and Systems, IEEE Computer Society Press, California, pp. 260–263.*

Poole, Lon, "Quicklime In Motion: Pasting Movies Into Documents Will Be As Easy As Pasting Graphics", Macworld, Sep. 1991, pp. 154–159.*

Rangan, P. Venkat, Vin, Harrick M. and Ramanathan, Srinivas, "Designing An On–Demand Multimedia Service", IEEE Communications Magazine, vol. 30, No. 7, Jul. 1992, pp. 56–64.*

Rowe, Lawrence A. and Smith, Brian C., "A Continuous Media Player", Proceeding of the 3$^{rd}$ International Workship on Network and OS Support for Digital Audio and Video, San Diego, CA, Nov. 1992.*

Rowe, Lawrence A. and Larson, Ray R., "A Video–on–Demand System", (apparently unpublished).*

Semilof, Margie, "NetWare to Get Multimedia Hooks", Communications Week, No. 469, Aug. 30, 1993, pp. 21–22.*

Story, Guy A., O'Gorman, Lawrence, Fox, David Schaper, Louise Levy, and Jagadish, H.V., "The RightPages Image–Based Electronic Library for Altering and Browsing", Computer, Sep. 1992, pp. 17–26.*

Tobagi, Fouad A. and Pang, Joseph, "StarWorks–A Video Applications Server", Digest of Papers COMPCON Spring'93, San Francisco, California, Feb. 22–26, 1993, IEEE Computer Society Press, pp. 4–11.*

"Interview: Expert Discusses Multimedia Implementations on Networks", Communications Week, No. 471, Sep. 13, 1993 pp. 22–23.*

Pres Syndicate of the University of Cambridge, Scenario–based Hypermedia: A Model and a System, 1990.*

* cited by examiner

LOW-LATENCY BUFFERING FOR PACKET TELEPHONY

The present application is related to U.S. application entitled "Low-Latency Audio Interface for Packet Telephony," which is filed on even date herewith. These two applications are co-pending and commonly assigned.

TECHNICAL FIELD

This invention relates to packet telephony in general and, more particularly, provides a way of reducing latency in packet telephony communications.

BACKGROUND OF THE INVENTION

Packet telephony involves the use of a packet network, such as the Internet or an "intranet" (modeled in functionality based upon the Internet and used by a companies locally or internally) for telecommunicating voice, pictures, moving images and multimedia (e.g., voice and pictures) content. Instead of a pair of telephones connected by switched telephone lines, however, packet telephony typically involves the use of a "packet phone" or "Internet phone" at one or both ends of the telephony link, with the information transferred over a packet network using packet switching techniques. A "packet phone" or "Internet phone" typically includes a personal computer (PC) running application software for implementing packetized transmission of audio signals over a packet network (such as the Internet); in addition, the PC-based configuration of a packet or Internet phone typically includes additional hardware devices, such as a microphone, speakers and a sound card, which are plugged or incorporated into the PC.

The amount of time it takes for a communication to travel through a communications network is referred to as latency. The amount of latency can impact the quality of the communication; the higher the latency, the lesser the quality of the communication. Latency of about 150 milliseconds (ms) or more produces a noticeable effect upon conversations that, for some people, can render a conversation next to impossible. The Plain Old Telephone Service (POTS) network controls latency to an acceptable degree, which is one of the ways in which the POTS network is deemed a reliable and quality communications service.

However, latency is a significant problem in packet telephony. Latency problems may be caused by factors such as traffic congestion or bottlenecks in the packet network, which can delay delivery of packets to the destination.

Another problem is caused by packet network "jitter." "Jitter" is the variance in latency from packet-to-packet or between groups of packets, such that packets (or packet groups) are not received at the destination at regular intervals. In packet telephony, packets are clocked into the packet network from the sending station at a regular rate; thus, network characteristics are responsible for deviation from regularity in the rate of receiving data packets at the receiving station.

Packet telephony programs use an input buffer at the receiving station to compensate for network jitter. Anti-jitter buffering is used to allow data to be clocked out of the buffer and into the telephony section at a regular rate. Each time voice input from the network starts at the receiving station, the packet telephony program directs the incoming data into the telephony input buffer, and does not start clocking the data out of the buffer (clocking audio data out of a memory is often called "playing" the data) and along to the speaker output until the telephony input buffer is full. For example, such input buffers may run several packets deep with an equivalent length (in terms of time) ranging from ½ to a full second of audio data. Thus, each time a speaker starts talking, perceptible latency is introduced as a result of anti-jitter buffering, making interactive conversations difficult or unnatural.

What is desired is a way of reducing the latency in packet telephony communications caused by buffering used to reduce or eliminate network jitter.

SUMMARY OF THE INVENTION

The present invention is directed to a method for reducing latency in packet telephony caused by anti-jitter buffering. When a second, or remote, user begins to speak, the telephony input buffer, which is used for anti-jitter buffering, is initially empty. As audio data are received, the data are placed in the telephony input buffer. However, rather than wait until the buffer is full, the audio data are clocked, or played, out of the buffer as soon as the first data element arrives and at a rate slower than the normal play rate. In this way, latency due to the initial buffer fill period is reduced or eliminated. Audio data continue to be played out at a slower than normal rate until the buffer fill level reaches a threshold. At that time, the play rate for sending data out of the telephony input buffer is adjusted to the normal play rate. This technique for starting playback at a slower rate before the buffer is fulled may be employed whenever the buffer empties, e.g. either as the result of the startup of a conversation, or of network delays or of loss of a burst of packets.

In an alternative embodiment of the present invention, the fill level of the telephony input buffer is controlled within a desired range by speeding up or slowing down the rate at which audio data are played out of the telephony input buffer. In yet another alternative embodiment, the amount of latency jitter in the packet network is measured and the size of the telephony input buffer is adjusted based upon the relative amount of jitter, such that the relative size of the buffer is reduced when the packet network is quiet, and the size of the buffer is increased when the network is relatively jittery.

DETAILED DESCRIPTION

The present invention is directed to a method for reducing latency in packet telephony caused by anti-jitter buffering. In accordance with the present invention, data are played out of the receivers's input buffer at variable rates, such that latency is reduced, while controlling the size of the buffer to reduce the effects of network jitter.

Figure 1:
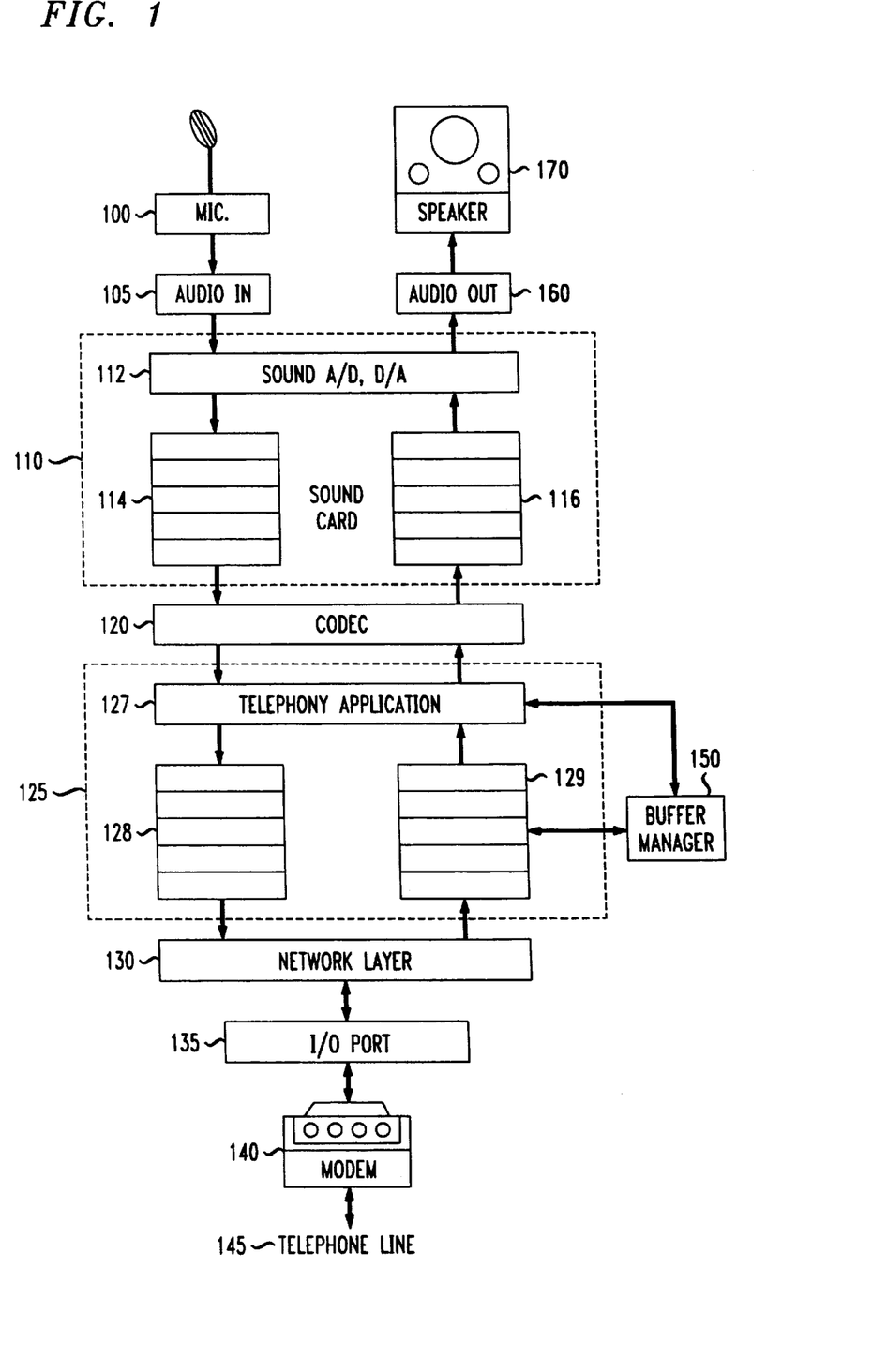
FIG. 1 shows a functional diagram for a PC-based packet phone utilizing the buffering management of the present invention.

FIG. 1 shows a functional diagram for a PC-based packet phone utilizing the buffering management of the present invention; the functionality shown in FIG. 1 is based upon the hardware/software functionality typically found in a PC-based packet phone. When a first user begins to speak into microphone 100 (which serves as the audio input device for the packet phone), an analog audio signal from microphone 100 is received into the PC-based packet phone via audio input port 105. Audio input port 105 is connected to sound card 110. The analog audio signal is delivered to sound card 110, where it is then digitized using an analog-to-digital (A/D) converter 112. Sound card 110 may be any one of a number of standard PC sound cards, such as the SoundBlaster™ 16 from Creative Labs. Sound card 110 also typically contains a pair of data buffers 114 and 116. Data buffer 114 buffers the audio data received from audio input port 105 and digitized by A/D converter 112 before being sent to CODEC 120. Typically, this data buffering is performed in accordance with an established protocol, such as that provided by a standard Microsoft audio driver supplied with the Microsoft Windows™ operating system.

CODEC 120 compresses the audio data for efficient transmission over the packet network. CODEC 120 may, typically, be either a hardware or software component that is well-known in communications and telephony applications to those skilled in the art.

The packet telephony product is a telephony program 125 having a telephony application 127 and data buffers 128 and 129. Telephony application 127 implements the functionality needed to prepare the data for transmission over a packet network. For example, telephony application 127 places the data into a form compatible with a data communications protocol used for transmitting data over a packet network. Telephony output buffer 128 buffers the data output by telephony application 127. Telephony output buffer 128 is kept as short as possible and is used to buffer data going out to the packet network in the event the network becomes temporarily busy at a particular instant, so that outgoing data are not lost.

The audio data from telephony output buffer 128 is then processed by network layer 130. Telephony application 127 requests that network layer 130 play data out of telephony buffer 128 as soon as placed in the buffer. Network layer 130 is a software communications application which adds one or more layers of data protocol, such as the well-known Transmission Control Protocol and Internet Protocol (TCP/IP), or the known User Datagram Protocol and Internet Protocol (UDP/IP), and/or the well-established point-to-point protocol (PPP) used for communicating over a packet network. TCP/IP is typically used for control and setup, while UDP/IP is often used for transmitting audio data because UDP/IP does not cause lost packets of audio data to be retransmitted. UDP/IP may be preferred for transmitting audio data because, for packet telephony, retransmitting lost audio data will degrade a conversation. PPP is typically employed when a modem is used to permit the PC connect to PC connect to a packet network, such as the Internet, using a standard dial-up telephone line. Network layer 130 is typically included as the network stack in the Microsoft Windows™ operating system. Packets are then sent to input/output (I/O) port 135, which is a standard serial port used for establishing a serial data connection between a PC and a peripheral device, such as a modem.

From I/O port 135, the data proceeds to modem 140, which converts the data to tones suitable for transmission over a standard POTS telephone line 145 to a connecting service used to connect to a packet network, such as the Internet.

It should be noted that connecting a PC to a packet network, such as the Internet, may be accomplished by any number of known techniques, such as through the use of a modem over a telephone line described above. Access to a packet network, such as the Internet, may also be accomplished through, e.g., use of an ISDN line, a cable television line, or a local area network using techniques known to those skilled in the art.

Once the data is sent to the packet network, the packet network transmits the data which is ultimately directed to a second user having a receiving terminal (e.g., another PC-based packet phone) at the other end of a TCP/IP-compatible connection established between the two users.

The second user may transmit audio or speech data back to the first user. The process of receiving external audio data from the second user over the packet network into the first user's PC-based packet phone is, in many respects, a reversal of the steps described above in connection with sending audio data from the first user's packet phone to the second user over the packet network. The external audio data packets are received from a packet network connecting service (i.e., Internet service provider) over POTS telephone line 145 into modem 140, which converts the data from tones into digital data packets. From modem 140 the data proceeds to I/O port 135 and then to network layer 130, which removes one or more protocol layers (such as TCP/IP, UDP/IP and/or PPP).

After network layer 130, the data is sent to telephony application 125 which directs the data into telephony input buffer 129. As mentioned above, telephony input buffer 129 is typically several data elements deep and, in an attempt to compensate for jitter, telephony program 125 delays playing the data out to speaker 170 from buffer 129, through telephony application 127, until telephony input buffer 129 is full or has reached a given threshold (typically, such a threshold would be one-half full); this introduces latency whenever the buffer empties, e.g., when the second user begins to speak.

In accordance with the present invention, buffer manager 150 operates to control telephony application 127 and telephony input buffer 129, such that data is played out of telephony input buffer before the buffer fills up. Buffer manager 150 clocks the audio data out at a rate less than the normal rate (i.e., at less than the real-time rate) which allows telephony input buffer 129 to fill—thus utilizing the effectiveness of the buffer in reducing jitter. In this way, latency normally introduced by virtue of the delay in the start of playing data from telephony input buffer 129 is eliminated while, at the same time, the taking advantage of the benefits afforded by buffering in the reduction of network jitter. This technique for starting play of data from the buffer at a slower rate before the buffer is fulled may be employed whenever the buffer empties, e.g. either as the result of the startup of a conversation, or of network delays or of loss of a burst of packets.

Once the data is played from telephony input buffer 129, it proceeds through the rest of the telephony and audio processing. Upon leaving input buffer 129, the data is processed by telephony application 127 and is sent to CODEC 120. CODEC 120 decompresses the audio data that was compressed (by the transmitting packet phone) for transmission over the packet network. From CODEC 120 the audio data is then sent to data buffer 116 of sound card 110. Data buffer 116 buffers the audio data, which is then converted into analog form by D/A converter 112 and sent in analog through audio output port 160 to speaker 170.

For purposes of the various aspects and embodiments of the invention described below, it is assumed that the PC-based packet telephone operates as discussed above with reference to the functional diagram of FIG. 1.

1. Startup.

Figure 2:
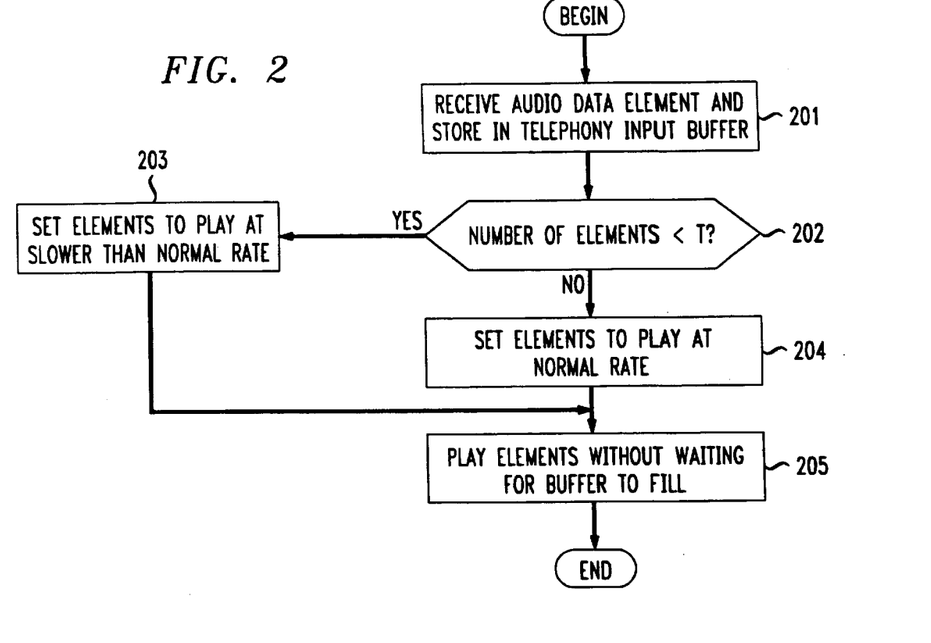
FIG. 2 shows a flow diagram of the startup process of the present invention.

The operation of the present invention at startup of a conversation by the second user will now be described in further detail with reference to FIG. 2, which shows a flow diagram of the startup process of the present invention. Those skilled in the art will recognize that the startup process may be employed whenever the buffer empties (and not just when a conversation begins). When the second user (who is remote from the first user) initially begins to speak, telephony input buffer 129 is typically empty. Buffer 129 will also typically be empty after a period of silence from the remote terminal as the result of silence suppression (in which the transmission of audio data packets from the remote terminal of the second user is temporarily halted during the period of silence by the second user), or as the result of network delays or loss of a burst of packets. As the first audio data begins to arrive after the second user begins to speak, they are placed in telephony :input buffer 129 as shown in block 201 of FIG. 2. Rather than waiting for the buffer to fill (either fully or to some predetermined level) with the data, as soon as the first data element(s) are received they are played out of the buffer. Initially, the number of data elements in telephony input buffer 129 is small, so that the data cannot be played out at the normal rate; otherwise, the buffer would not fill.

The initiation of playing out data from the buffer may begin as soon as the first data element is received. Alternatively, the playing of data out of the buffer may await the receipt of a small number of data elements, such number being less than one-half full (e.g., 2 elements), before the data are played out of the buffer.

Thus, in accordance with the present invention, the number of data elements in buffer 129 is compared against a threshold value, T, as shown in block 202. The threshold value represents a number of data elements or, alternatively, the threshold T could be provided as a unit of time (as the data elements are expected to be received at regular intervals, there is a direct correlation between expected duration and the number of elements of audio data) or the desired relative fill percentage for the buffer (i.e., the ratio of the number of data elements in the buffer to the total size or capacity of the full buffer). Illustratively, the threshold value may be set to represent approximately 50% of the size of the buffer (i.e., the desired fill percentage would be 50%).

If the number of data elements in buffer 129 is less than the threshold value T, the elements are set to play out at a slower than normal rate as shown in block 203, and the elements are played as shown in block 205 without waiting for the buffer to fill. Illustratively, elements may be played out at a rate equal to approximately 90% of the normal or expected rate at which audio data elements arrive. In this way, the audio data will be processed and speech heard at speaker 170 at a time before buffer 129 would have filled without playing any data. At the same time, because the data are being played out at a rate slower than the rate at which they arrive in telephony input buffer 129, buffer 129 slowly begins to fill with data elements.

The slower rate at which the data is played out should be a rate at which the speech nonetheless is intelligible. A 90% play rate is barely noticeable and not objectionable; other rates may, similarly, prove acceptable.

At some point during the continuing receipt of audio data, the number of data elements in the buffer will be equal to or exceed the threshold value, T, where T may represent an optimal or desired number of elements to be contained in telephony input buffer 129. When that is the case, comparison between the number of elements in the buffer to the threshold value T at block 202 will produce a response that the number of data elements is not less than the threshold T and, as shown in block 204, the rate of playing the audio data out of buffer 129 is then set to the normal rate. In this way, it is expected that the number of data elements arriving at buffer 129 will be roughly equal to the number of elements played out of buffer 129 and, thus, the relative buffer "fill" percentage would be expected to remain approximately the same over time. Of course, given the nature of the network jitter problem, there will be short-term fluctuations in the telephony input buffer fill percentage.

2. Controlled Buffering.

Figure 3:
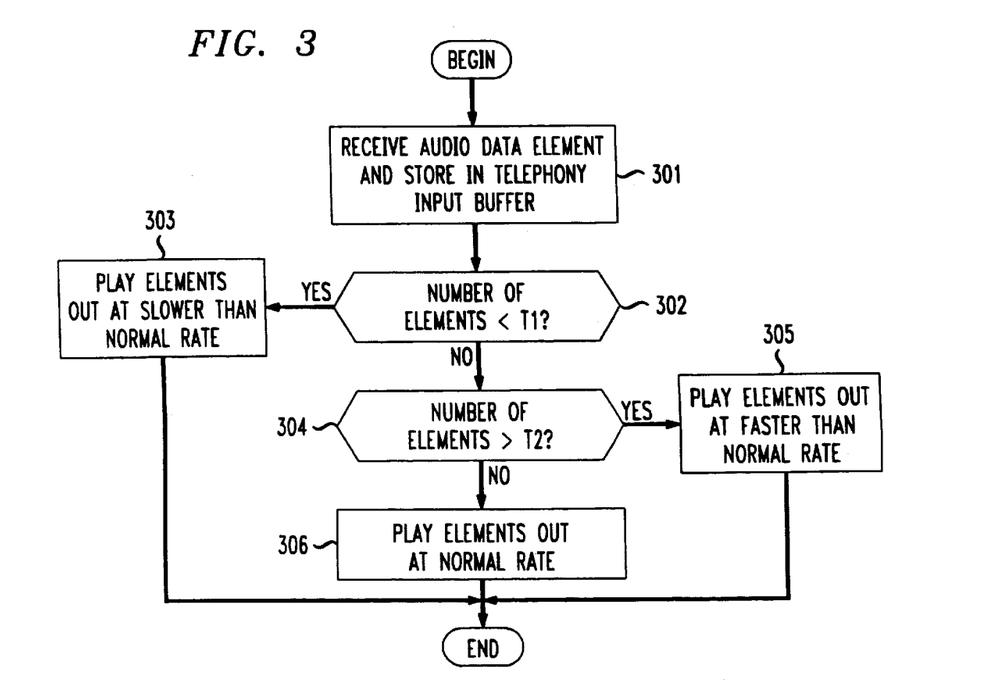
FIG. 3 shows a flow diagram for controlled buffering in an alternative embodiment of the present invention.

Turning now to FIG. 3, another embodiment of the present invention will now be described in which the number of elements in telephony buffer 129 is controlled over time to be constrained within a desired range (this process is not limited to the startup of a conversation). This provides the benefit of not permitting the buffer to overfill or empty out, such that the conversation will appear more natural. As before, in block 301 audio data arriving from the remote terminal of the second user are placed in telephony input buffer 129. As shown in block 302, the number of data elements in buffer 129 is compared against a first threshold value, T1. The threshold value T1 represents a number of data elements or, alternatively, could be provided as a unit of time (as the data elements are expected to be received at regular intervals, there is a direct correlation between expected duration and the number of elements of audio data). If the number of elements in buffer 129 is less than the first threshold value T1, the elements are played out at a slower than normal rate as shown in block 303. As discussed above, the play rate should be one that provides acceptable audio speech quality at the speaker output. Because the rate is lower than the normal rate, it is expected that the buffer would slowly begin to fill to a greater percentage.

If the number of elements is not less than the first threshold, T1, the number is then compared at block 304 against a second threshold value, T2, which is higher than the first threshold value, T1. If the number of elements is greater than the second threshold value, T2, the rate at which audio data elements are played out of the buffer is set at block 305 to a rate faster than the normal rate. When the play rate is faster than normal, it is then expected that the buffer would slowly begin to empty.

If comparison at block 304 of the number of elements filling input buffer 129 with the second threshold, T2, reveals that the number of elements is less than (or equal to) T2, then the play rate, as shown at block 306, the rate of playing the audio data out of buffer 129 is then set to the normal play rate. In this way, the number of data elements filling telephony input buffer 129 is controlled such that the number of elements is steered to the range between T1 and T2. As described above, the threshold values T1 and T2 may be expressed as a number of elements, a unit of time, or the relative fill percentage for the buffer. Illustratively, the threshold values T1 and T2 may be set to represent approximately 25% and 75% of the size of the buffer, respectively.

Figure 4A:
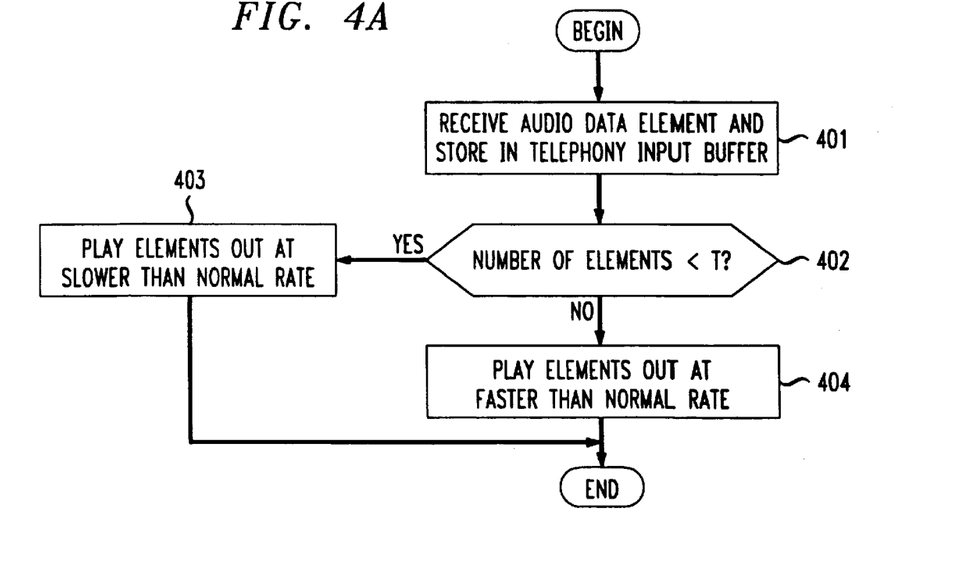
FIG. 4A shows a flow diagram for controlled buffering in another alternative embodiment of the present invention.

In an alternative embodiment of the present invention, controlled buffering may be performed in essentially a continuous manner by collapsing the two thresholds, T1 and T2, into a single threshold value T, as shown in FIG. 4A. At block 401 audio data elements arriving from the remote terminal of the second user are placed in telephony input buffer 129. As shown in block 402, the number of elements in buffer 129 is compared against a threshold value, T. If the number of elements is less than the threshold value, T, the audio data are played out at a slower than normal rate as shown in block 403. If the number of elements is greater than or equal to the threshold value, the elements are played out at a faster than normal rate as shown in block 404.

Figure 4B:
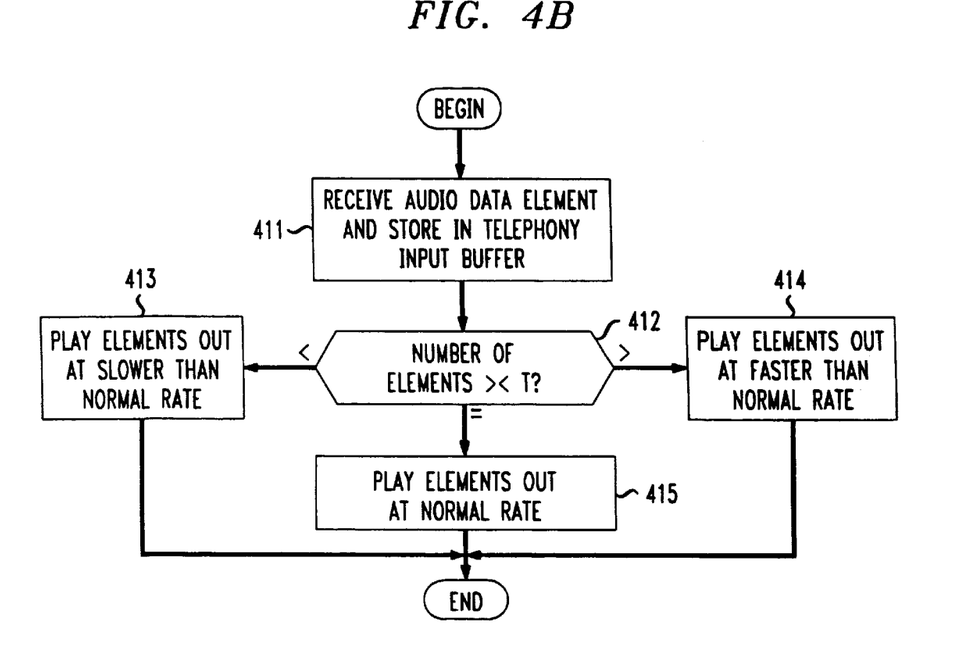
FIG. 4B shows a flow diagram for controlled buffering in another alternative embodiment of the present invention.

An alternative to this embodiment is shown in FIG. 4B. At block 411 audio data arriving from the remote terminal of the second user are placed in telephony input buffer 129. As shown in block 412, the number of data elements in buffer 129 is compared against a threshold value, T. If the number of elements is less than the threshold value, T, the elements are played out at a slower than normal rate as shown in block 413. If the number of data elements is greater than the threshold value, the elements are played out at a faster than normal rate as shown in block 414. If the number of elements is equal to the threshold, T, the rate is set to the normal rate at block 415.

3. Dynamic Buffer Sizing.

In addition to controlling the rate at which audio data elements are played out of the telephony input buffer, the size of the buffer itself may be controlled. The longer the buffer, the greater the potential latency in the audio that is eventually heard at the speaker output. The length of the buffer required to be effective in reducing jitter is dependent upon the relative amount of jitter presented by the packet network. If the network is "quiet," such that the data packets arrive in relatively regular intervals (i.e., the variance in the intervals between packet arrivals is small), the amount of buffering required is slight. Thus, for a "quiet" network, a short buffer (in terms of the number of data elements) may suffice. On the other hand, if the network is jittery—meaning that the variance in the intervals between data packet arrivals is relatively large—a greater amount of buffering is required in order to compensate for the jitter. Adjusting the size of the telephony input buffer to network conditions (i.e., is the network relatively stable or jittery) then provides the advantage of minimizing any latency unnecessarily introduced by the jitter-correcting buffering scheme.

Figure 5:
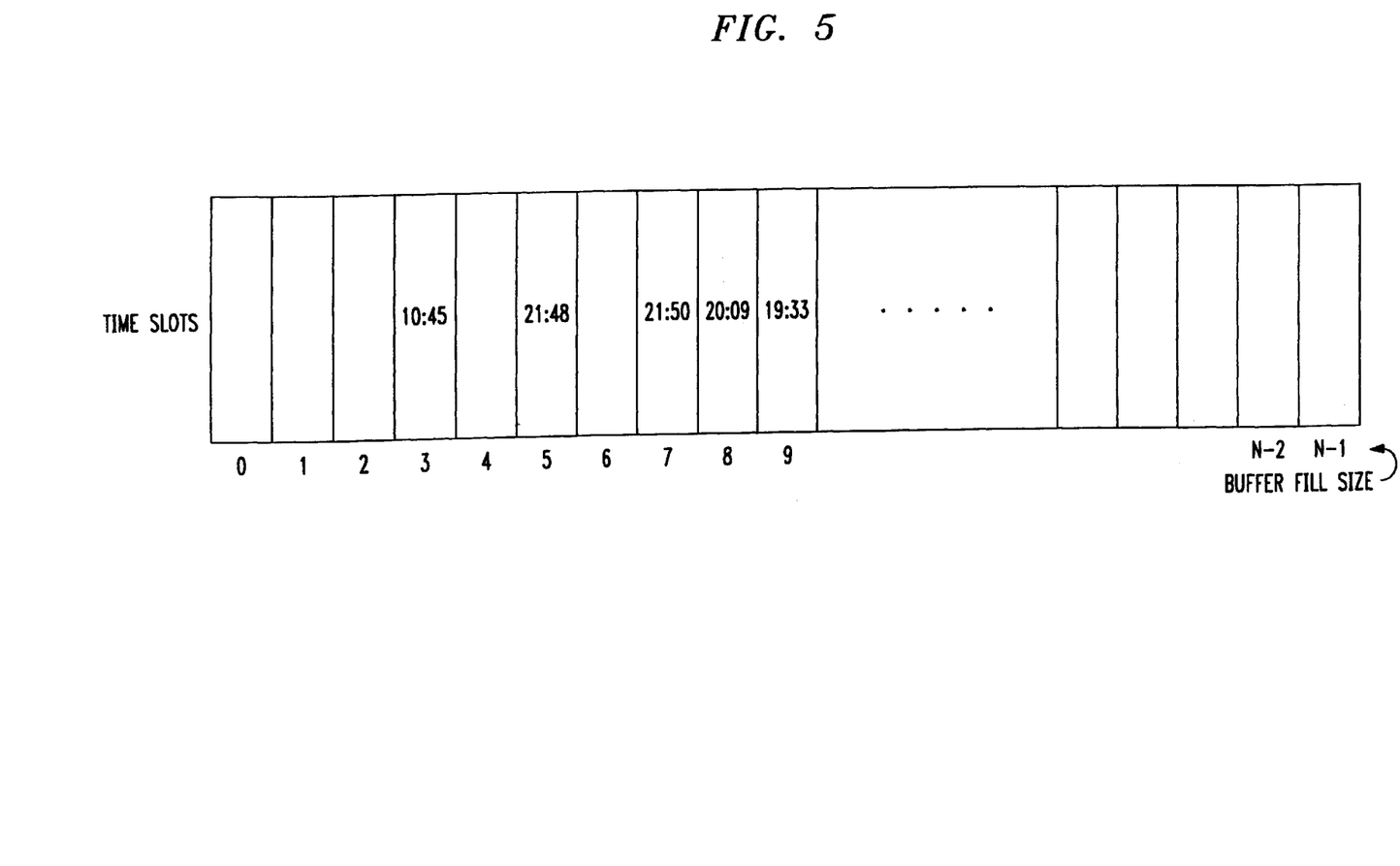
FIG. 5 shows the data structure for a jitter array used in accordance with the present invention.

The method of the present invention for determining the relative network stability (or jitter) and dynamically sizing the telephony input buffer utilizes an array having a length approximately equal to the number (e.g., the maximum number) of elements in the telephony input buffer. The elements of the array (referred to herein as the "jitter array") are indexed by the potential number of data elements present in the input buffer at any given time, and each element of the array represents the most recent time in which the number of data elements present in the input buffer is equal to the index value of the element. That is, the value stored in the zeroth element of the jitter array represents the most recent time in which the telephony input buffer held no audio data elements; the value stored in the first element of the array represents the most recent time in which the telephony input buffer held one audio data element; the value stored in the second element of the array represents the most recent time in which the telephony input buffer held two audio data elements, and so on. The data structure for a jitter array of length N is depicted in FIG. 5, where, for purposes of illustration, the time values 10:45, 21:48, 21:50, 20:09 and 19:33 are stored in array elements 3, 5, 7, 8 and 9, representing the last time in which the telephony input buffer held 3, 5, 7, 8 and 9 audio data elements, respectively.

Figure 6A:
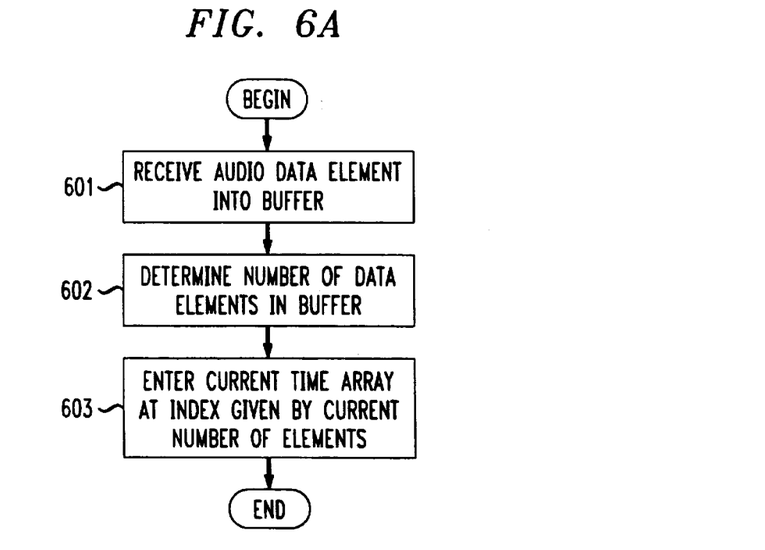
FIG. 6A shows a flow diagram for updating a jitter array in accordance with the present invention.

The telephony input buffer is measured on a periodic basis, such as, for example, each time a data element is received as shown at block 601 in FIG. 6A. The number of data elements in the buffer is determined, as shown in block 602, and at block 603 the time at which the measurement is taken is stored in the array, where the index for the storage element in the array is the current number of data elements. If the number of audio data elements in the buffer does not change from one observation to the next, the latest observed time will be entered into the same element of the jitter array as the one containing the previous time entry, thus overwriting that time entry. If the number of data elements has changed from the previous observation, the previous time entry would not be overwritten by the latest time—the latest time would, instead, be written in a different element according to the number of audio data elements currently in the buffer.

The relative measure of network stability or jitter may be determined by observing the array at various time intervals, including on a periodic basis, and measuring the time it has taken to have a change in the number of audio data elements in the telephony input buffer; this may be done by comparing the most recent time entry in the jitter array with other time entries in the jitter array. For example, the larger the time difference between the most recent entry and the next most recent entry, the more time it has taken for a change in the number of data elements in the buffer and, accordingly, the quieter (more stable) the network. The smaller the time difference, the less time it has taken for the number of data elements in the buffer to change and, accordingly, the noisier (more jittery) the network.

Figure 6B:
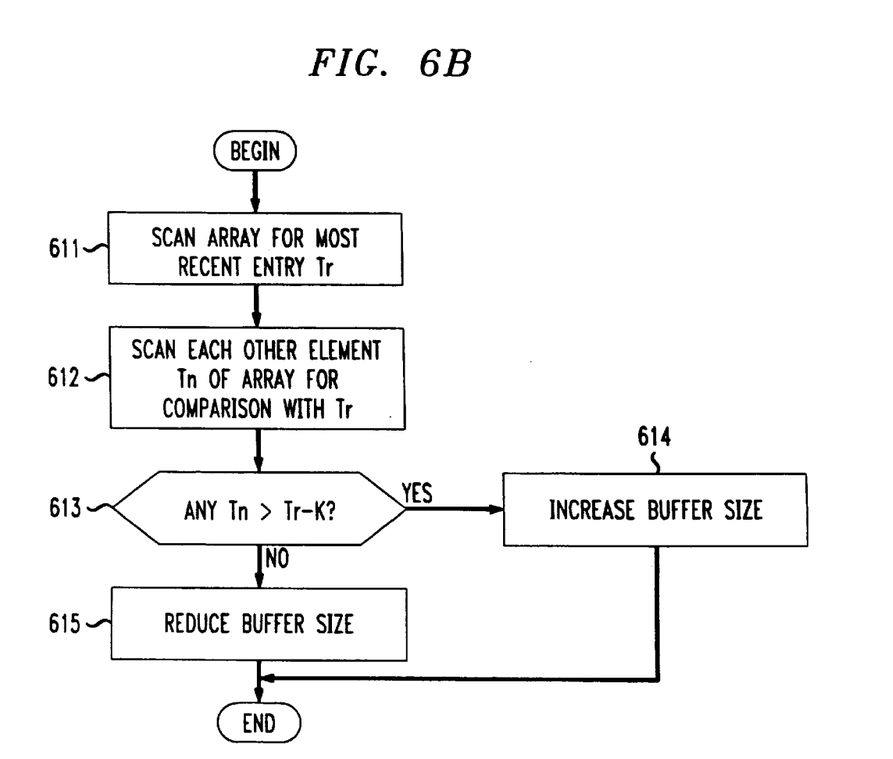
FIG. 6B shows a flow diagram for measuring jitter in accordance with the present invention.

Shown in FIG. 6B is a technique for determining jitter as a measure of the whether any time entry exceeds the difference between the most recent entry and a constant. As shown at block 611, the measurement of jitter begins with scanning the jitter array for the most recent time entry, Tr. The index of the element in the jitter array having the most recent time entry represents the most recent measurement of the number of data elements in the buffer. Each element of the jitter array Tn (other than the element corresponding to Tr) is then scanned at block 612. At block 613, each time element Tn is compared with the difference between Tr (i.e., the most recent time entry) and a threshold time value, K. If any time element Tn is larger than the difference Tr−K, this means that the buffer size has changed within the last K time units and the network is considered relatively noisy so as to warrant an increase in the size of the buffer as shown in block 614.

On the other hand, if all other time entries Tn are less than Tr−K at block 613, this means that the buffer size has not changed within the last K time units, and the network is considered quiet enough to reduce the buffer size, which is then accordingly reduced by one element at block 615 (unless the buffer size is already at a minimum size).

Optionally, to account for the fact that a change in one or two data elements may not be considered significant for purposes of measuring jitter, the process described above with reference to FIG. 6B may be modified so that, once the most recent time entry in the jitter array, Tr, is determined, the neighboring elements of the array (i.e., the closest one or two elements on either side of the most recent time element in the array) are ignored for purposes of determining whether any of the other time entries, Tn, exceeds Tr−K.

Figure 6C:
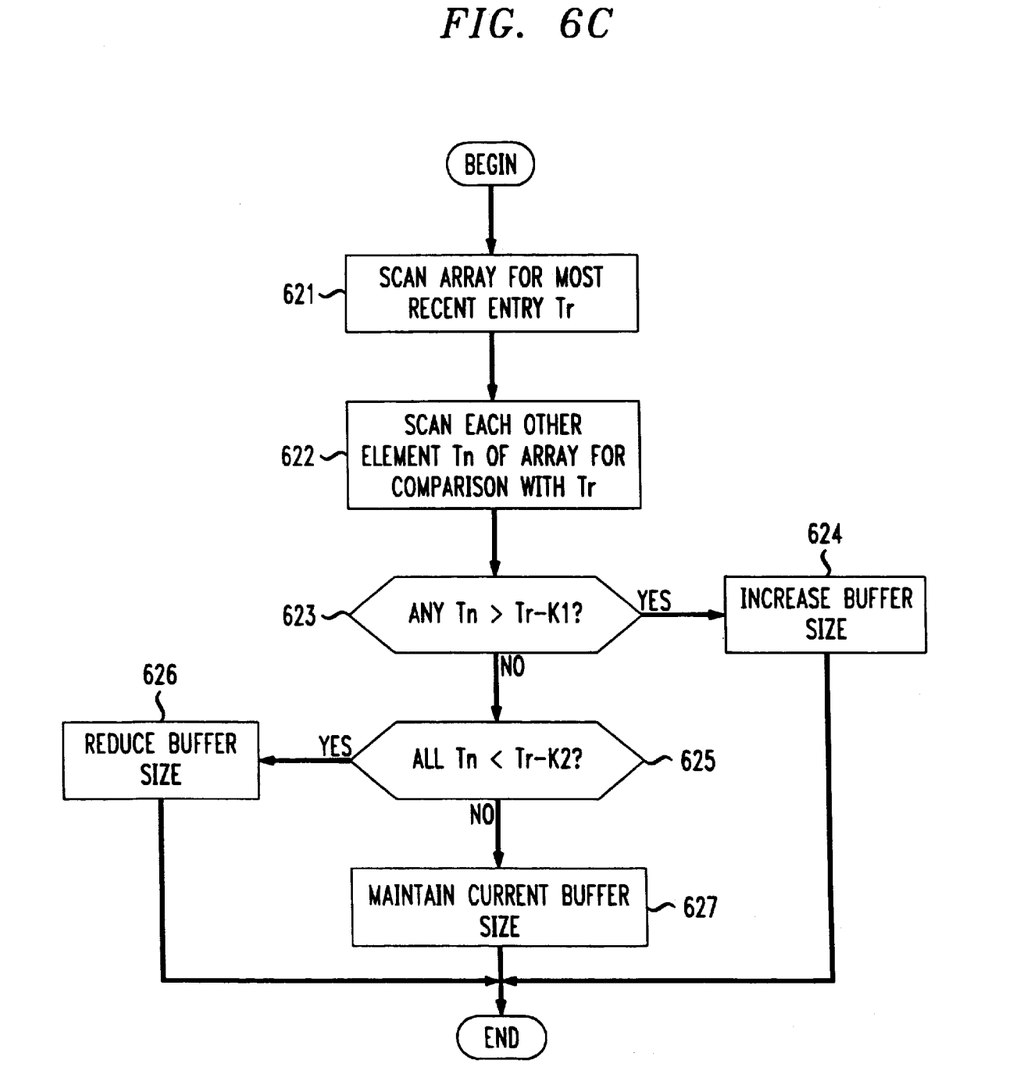
FIG. 6C shows a flow diagram for measuring jitter in accordance with an alternative embodiment of the present invention.

An alternative embodiment of the present invention will now be explained with reference to FIG. 6C. The measurement of jitter begins as shown in FIG. 6C by scanning the jitter array for the most recent time entry, Tr, as shown at block 621. Each element of the jitter array Tn (other than the element corresponding to Tr) is then scanned at block 622. Each time element Tn is compared with the difference between Tr (i.e., the most recent time entry) and a threshold time value. At block 623, if any time element Tn is larger than the difference between Tr and a first threshold K1 (i.e., Tr−K1), this means that the buffer size has changed within the last K1 time units and the network is considered relatively noisy so as to warrant an increase in the size of the buffer as shown in block 624.

On the other hand, at block 625, if all time elements Tn are less than the difference between Tr and a second threshold K2 (i.e., Tr−K2), this means that the buffer size has not changed within the last K2 time units (K2 being greater than K1) and the network is considered quiet enough to reduce the buffer size, which is then accordingly reduced by one element at block 626 (unless the buffer size is already at a minimum size).

If the time elements Tn are all less than Tr−K1 and if any element Tn is greater than Tr−K2, the network is considered unchanged and the current buffer size is maintained at block 627.

Optionally, to account for the fact that a change in one or two data elements may not be considered significant for purposes of measuring jitter, the process described above with reference to FIG. 6C may be modified so that, once the most recent time entry in the jitter array, Tr, is determined, the neighboring elements of the array (i.e., the closest one or two elements on either side of the most recent time element in the array) are ignored for purposes of measuring any of the other time entries, Tn, against Tr.

In another alternative embodiment of the present invention, the dynamic buffer sizing described immediately above may be combined with the startup and/or controlled buffering processes described in sections 1 and 2 above. Thus, both the rate at which data elements are played out of the telephony input buffer, as well as the size of the buffer, may be controlled in order to correct for network jitter while optimally reducing the latency introduced by the anti-jitter buffering.

In summary, the present invention provides a way of reducing latency in packet telephony which is introduced by anti-jitter buffering.

What has been described is merely illustrative of the application of the principles of the present invention. Other arrangements and methods can be implemented by those skilled in the art without departing from the spirit and scope of the present invention.

What is claimed is:

1. For use in a packet telephony communication system wherein data elements are received over a packet network into a buffer used for handling input data elements, a method for reducing latency after said buffer is empty, comprising the steps of:
   a. determining a measure of the number of data elements contained in the buffer;
   b. comparing the measure of the number of data elements contained in the buffer with a threshold value;
   c. if the determined measure of the number of data elements is less than the threshold value, setting the rate at which data elements are played out of the buffer to a rate slower than a normal rate for playing data elements out of the buffer;
   d. if the determined measure of the number of data elements is not less than the threshold value, setting the rate at which data elements are played out of the buffer to a rate equal to the normal rate; and
   e. playing at least one data element out of the buffer at the set rate, after the buffer has filled with data elements to a predetermined level, the predetermined level being less than the threshold value.

2. The method according to claim 1, wherein the measure of the number of data elements contained in the buffer comprises a percentage corresponding to the ratio of the actual number of data elements in the buffer to the buffer's full capacity.

3. The method according to claim 2, wherein the threshold value is approximately 50 percent.

4. The method according to claim 1, wherein the rate slower than the normal rate is approximately 90 percent of the normal rate.

5. The method according to claim 1, wherein the predetermined level is no more than two data elements.

6. A method for reducing latency in a packet telephony communication system, wherein data elements are received over a packet network into a buffer used for handling input data elements and then played out of the buffer, comprising the steps of:
   a. determining a measure of the number of data elements contained in the buffer;
   b. comparing the measure of the number of data elements contained in the buffer with a first threshold value;
   c. if the determined measure of the number of data elements is less than the first threshold value, setting the rate at which data elements are played out of the buffer to a first rate; and
   d. if the determined measure of the number of data elements is not less than the first threshold value:
      i. comparing the measure of the number of data elements contained in the buffer with a second threshold value;
      ii. if the determined measure of the number of data elements is greater than the second threshold value, setting the rate at which data elements are played out of the buffer to a second rate; and
      iii. if the determined measure of the number of data elements is not greater than the second threshold value, setting the rate at which data elements are played out of the buffer to a third rate.

7. The method according to claim 6, wherein:
   a. the first threshold is less than the second threshold value;
   b. the first rate is a rate slower than a normal rate for playing data elements out of the buffer;
   c. the second rate is a rate faster than the normal rate for playing data elements out of the buffer; and
   d. the third rate is a rate equal to the normal rate for playing data elements out of the buffer.

8. The method according to claim 7, wherein:
   a. the measure of the number of data elements contained in the buffer comprises a percentage corresponding to the ratio of the actual number of data elements in the buffer to the buffer's full capacity;
   b. the first threshold value is approximately 25 percent; and
   c. the second threshold value is approximately 75 percent.

9. The method according to claim 8, wherein the rate slower than the normal rate is approximately 90 percent of the normal rate.

10. The method according to claim 7, wherein:
    a. the first threshold value is equal to the second threshold value;

b. the first rate is a rate slower than a normal rate for playing data elements out of the buffer; and c. each of the second rate and the third rate is a rate faster than the normal rate for playing data elements out of the buffer.

11. The method according to claim 10, wherein the measure of the number of data elements contained in the buffer comprises a percentage corresponding to the ratio of the actual number of data elements in the buffer to the buffer's full capacity.

12. The method according to claim 11, wherein the threshold value is approximately 50 percent.

13. The method according to claim 11, wherein the rate slower than the normal rate is approximately 90 percent of the normal rate.

14. The method according to claim 7, wherein:

a. the first threshold value is equal to the second threshold value;

b. the first rate is a rate slower than a normal rate for playing data elements out of the buffer;

c. the second rate is a rate faster than the normal rate for playing data elements out of the buffer; and d. the third rate is a rate equal to normal rate for playing data elements out of the buffer.

15. The method according to claim 14, wherein the measure of the number of data elements contained in the buffer comprises a percentage corresponding to the ratio of the actual number of data elements in the buffer to the buffer's full capacity.

16. The method according to claim 15, wherein the threshold value is approximately 50 percent.

17. The method according to claim 15, wherein the rate slower than the normal rate is approximately 90 percent of the normal rate.

18. A method for reducing latency in a packet telephony communication system, wherein data elements are received over a packet network into a buffer used for handling input data elements and then played out of the buffer, comprising the steps of:

a. storing a measure of the number of data elements contained in the buffer over time;

b. determining a measure of the relative stability in time intervals between the receipt of data elements over the packet network;

c. comparing the determined measure of the relative stability in time intervals with a threshold value;

d. if the determined measure of the relative stability in time intervals is greater than the threshold value, reducing the size of the buffer; and e. if the determined measure of the relative stability in time intervals is not greater than the first threshold value, increasing the size of the buffer.

19. The method according to claim 18, wherein the threshold value is obtained by determining the difference between the time at which the most recent measure of the number of data elements contained in the buffer was stored and a constant, and wherein the step of determining a measure of the relative stability in time intervals between the receipt of data elements over the packet network comprises determining a plurality of time values at which the measure of the number of data elements contained in the buffer was stored, said plurality of time values excluding the time at which the most recent measure of the number of data elements contained in the buffer was stored.

20. The method according to claim 19, wherein said plurality of time values further exclude those time values corresponding to a measure of the number of data elements within a predetermined number of the most recent measure of the number of data elements.

21. The method according to claim 19, further comprising the steps of:

f. determining a measure of the number of data elements contained in the buffer;

g. comparing the measure of the number of data elements contained in the buffer with a threshold value;

h. if the determined measure of the number of data elements is less than the threshold value, setting the rate at which data elements are played out of the buffer to a rate slower than a normal rate for playing data elements out of the buffer;

i. if the determined measure of the number of data elements is not less than the threshold value, setting the rate at which data elements are played out of the buffer to a rate equal to the normal rate; and j. playing at least one data element out of the buffer at the set rate without waiting for the buffer to fill with data elements to a predetermined level.

22. A method for reducing latency in a packet telephony communication system, wherein data elements are received over a packet network into a buffer used for handling input data elements and then played out of the buffer, comprising the steps of:

a. storing a measure of the number of data elements contained in the buffer over time;

b. determining a measure of the relative stability in time intervals between the receipt of data elements over the packet network;

c. comparing the determined measure of the relative stability in time intervals with a first threshold value;

d. if the determined measure of the relative stability in time intervals is greater than the first threshold value, reducing the size of the buffer; and e. if the determined measure of the relative stability in time intervals is not greater than the first threshold value:

i. comparing the determined measure of the relative stability in time intervals with a second threshold value;

ii. if the determined measure of the relative stability in time intervals is less than the second threshold value, increasing the size of the buffer; and f. if the determined measure of the relative stability in time intervals is not less than the second threshold value, maintaining the current size of the buffer.

23. The method according to claim 22, wherein the first threshold value is obtained by determining the difference between the time at which the most recent measure of the number of data elements contained in the buffer was stored and a first constant, wherein the second threshold value is obtained by determining the difference between the time at which the most recent measure of the number of data elements contained in the buffer was stored and a second constant, and wherein the step of determining a measure of the relative stability in time intervals between the receipt of data elements over the packet network comprises determining a plurality of time values at which the measure of the number of data elements contained in the buffer was stored, said plurality of time values excluding the time at which the most recent measure of the number of data elements contained in the buffer was stored.

24. The method according to claim 23, wherein said plurality of time values further exclude those time values corresponding to a measure of the number of data elements within a predetermined number of the most recent measure of the number of data elements.

25. The method according to claim 23, further comprising the steps of:

g. determining a measure of the number of data elements contained in the buffer;

h. comparing the measure of the number of data elements contained in the buffer with a threshold value;

i. if the determined measure of the number of data elements is less than the threshold value, setting the rate at which data elements are played out of the buffer to a rate slower than a normal rate for playing data elements out of the buffer;

j. if the determined measure of the number of data elements is not less than the threshold value, setting the rate at which data elements are played out of the buffer to a rate equal to the normal rate; and k. playing at least one data element out of the buffer at the set rate without waiting for the buffer to fill with data elements to a predetermined level.

26. An article of manufacture comprising a computer-readable medium having stored thereon instructions for use in conjunction with a computer-based packet telephony communication system wherein data elements are received over a packet network into a buffer used for handling input data elements, said instructions which, when executed, define a series of steps causing the packet telephony communication system to reduce latency after said buffer is empty, said steps comprising:

a. determining a measure of the number of data elements contained in the buffer;

b. comparing the measure of the number of data elements contained in the buffer with a threshold value;

c. if the determined measure of the number of data elements is less than the threshold value, setting the rate at which data elements are played out of the buffer to a rate slower than a normal rate for playing data elements out of the buffer;

d. if the determined measure of the number of data elements is not less than the threshold value, setting the rate at which data elements are played out of the buffer to a rate equal to the normal rate; and e. playing at least one data element out of the buffer at the set rate, after the buffer has filled with data elements to a predetermined level, the predetermined level being less than the threshold value.

27. The article of manufacture according to claim 26, wherein the measure of the number of data elements contained in the buffer comprises a percentage corresponding to the ratio of the actual number of data elements in the buffer to the buffer's full capacity.

28. The article of manufacture according to claim 27, wherein the threshold value is approximately 50 percent.

29. The article of manufacture according to claim 27, wherein the rate slower than the normal rate is approximately 90 percent of the normal rate.

30. The article of manufacture according to claim 26, wherein the predetermined level is no more than two data elements.

31. An article of manufacture comprising a computer-readable medium having stored thereon instructions for use in conjunction with a computer-based packet telephony communication system wherein data elements are received over a packet network into a buffer used for handling input data elements and then played out of the buffer, said instructions which, when executed, define a series of steps causing the packet telephony communication system to reduce latency, said steps comprising:

a. determining a measure of the number of data elements contained in the buffer;

b. comparing the measure of the number of data elements contained in the buffer with a first threshold value;

c. if the determined measure of the number of data elements is less than the first threshold value, setting the rate at which data elements are played out of the buffer to a first rate; and d. if the determined measure of the number of data elements is not less than the first threshold value:

i. comparing the measure of the number of data elements contained in the buffer with a second threshold value;

ii. if the determined measure of the number of data elements is greater than the second threshold value, setting the rate at which data elements are played out of the buffer to a second rate; and iii. if the determined measure of the number of data elements is not greater than the second threshold value, setting the rate at which data elements are played out of the buffer to a third rate.

32. The article of manufacture according to claim 31, wherein:

a. the first threshold is less than the second threshold value;

b. the first rate is a rate slower than a normal rate for playing data elements out of the buffer;

c. the second rate is a rate faster than the normal rate for playing data elements out of the buffer; and d. the third rate is a rate equal to the normal rate for playing data elements out of the buffer.

33. The article of manufacture according to claim 32, wherein:

a. the measure of the number of data elements contained in the buffer comprises a percentage corresponding to the ratio of the actual number of data elements in the buffer to the buffer's full capacity;

b. the first threshold value is approximately 25 percent; and c. the second threshold value is approximately 75 percent.

34. The article of manufacture according to claim 32, wherein the rate slower than the normal rate is approximately 90 percent of the normal rate.

35. The article of manufacture according to claim 33, wherein:

a. the first threshold value is equal to the second threshold value;

b. the first rate is a rate slower than a normal rate for playing data elements out of the buffer; and c. each of the second rate and the third rate is a rate faster than the normal rate for playing data elements out of the buffer.

36. The article of manufacture according to claim 35, wherein the measure of the number of data elements contained in the buffer comprises a percentage corresponding to the ratio of the actual number of data elements in the buffer to the buffer's full capacity.

37. The article of manufacture according to claim 36, wherein the threshold value is approximately 50 percent.

38. The article of manufacture according to claim 37, wherein the rate slower than the normal rate is approximately 90 percent of the normal rate.

39. The article of manufacture according to claim 33, wherein:
 a. the first threshold value is equal to the second threshold value;
 b. the first rate is a rate slower than a normal rate for playing data elements out of the buffer;
 c. the second rate is a rate faster than the normal rate for playing data elements out of the buffer; and
 d. the third rate is a rate equal to normal rate for playing data elements out of the buffer.

40. The article of manufacture according to claim 39, wherein the measure of the number of data elements contained in the buffer comprises a percentage corresponding to the ratio of the actual number of data elements in the buffer to the buffer's full capacity.

41. The article of manufacture according to claim 40, wherein the threshold value is approximately 50 percent.

42. The article of manufacture according to claim 41, wherein the rate slower than the normal rate is approximately 90 percent of the normal rate.

43. An article of manufacture comprising a computer-readable medium having stored thereon instructions for use in conjunction with a computer-based packet telephony communication system wherein data elements are received over a packet network into a buffer used for handling input data elements and then played out of the buffer, said instructions which, when executed, define a series of steps causing the packet telephony communication system to reduce latency, said steps comprising:
 a. storing a measure of the number of data elements contained in the buffer over time;
 b. determining a measure of the relative stability in time intervals between the receipt of data elements over the packet network;
 c. comparing the determined measure of the relative stability in time intervals with a threshold value;
 d. if the determined measure of the relative stability in time intervals is greater than the threshold value, reducing the size of the buffer; and
 e. if the determined measure of the relative stability in time intervals is not greater than the first threshold value, increasing the size of the buffer.

44. The article of manufacture according to claim 43, wherein the threshold value is obtained by determining the difference between the time at which the most recent measure of the number of data elements contained in the buffer was stored and a constant, and wherein the step of determining a measure of the relative stability in time intervals between the receipt of data elements over the packet network comprises determining a plurality of time values at which the measure of the number of data elements contained in the buffer was stored, said plurality of time values excluding the time at which the most recent measure of the number of data elements contained in the buffer was stored.

45. The article of manufacture according to claim 44, wherein said plurality of time values further exclude those time values corresponding to a measure of the number of data elements within a predetermined number of the most recent measure of the number of data elements.

46. The article of manufacture according to claim 45, further comprising the steps of:
 f. determining a measure of the number of data elements contained in the buffer;
 g. comparing the measure of the number of data elements contained in the buffer with a threshold value;
 h. if the determined measure of the number of data elements is less than the threshold value, setting the rate at which data elements are played out of the buffer to a rate slower than a normal rate for playing data elements out of the buffer;
 i. if the determined measure of the number of data elements is not less than the threshold value, setting the rate at which data elements are played out of the buffer to a rate equal to the normal rate; and
 j. playing at least one data element out of the buffer at the set rate without waiting for the buffer to fill with data elements to a predetermined level.

47. An article of manufacture comprising a computer-readable medium having stored thereon instructions for use in conjunction with a computer-based packet telephony communication system wherein data elements are received over a packet network into a buffer used for handling input data elements and then played out of the buffer, said instructions which, when executed, define a series of steps causing the packet telephony communication system to reduce latency, said steps comprising:
 a. storing a measure of the number of data elements contained in the buffer over time;
 b. determining a measure of the relative stability in time intervals between the receipt of data elements over the packet network;
 c. comparing the determined measure of the relative stability in time intervals with a first threshold value;
 d. if the determined measure of the relative stability in time intervals is greater than the first threshold value, reducing the size of the buffer; and
 e. if the determined measure of the relative stability in time intervals is not greater than the first threshold value:
  i. comparing the determined measure of the relative stability in time intervals with a second threshold value;
  ii. if the determined measure of the relative stability in time intervals is less than the second threshold value, increasing the size of the buffer; and
 f. if the determined measure of the relative stability in time intervals is not less than the second threshold value, maintaining the current size of the buffer.

48. The article of manufacture according to claim 47, wherein the first threshold value is obtained by determining the difference between the time at which the most recent measure of the number of data elements contained in the buffer was stored and a first constant, wherein the second threshold value is obtained by determining the difference between the time at which the most recent measure of the number of data elements contained in the buffer was stored and a second constant, and wherein the step of determining a measure of the relative stability in time intervals between the receipt of data elements over the packet network comprises determining a plurality of time values at which the measure of the number of data elements contained in the buffer was stored, said plurality of time values excluding the time at which the most recent measure of the number of data elements contained in the buffer was stored.

49. The article of manufacture according to claim 48, wherein said plurality of time values further exclude those time values corresponding to a measure of the number of data elements within a predetermined number of the most recent measure of the number of data elements.

50. The article of manufacture according to claim 49, further comprising the steps of:

g. determining a measure of the number of data elements contained in the buffer;

h. comparing the measure of the number of data elements contained in the buffer with a threshold value;

i. if the determined measure of the number of data elements is less than the threshold value, setting the rate at which data elements are played out of the buffer to a rate slower than a normal rate for playing data elements out of the buffer;

j. if the determined measure of the number of data elements is not less than the threshold value, setting the rate at which data elements are played out of the buffer to a rate equal to the normal rate; and k. playing at least one data element out of the buffer at the set rate without waiting for the buffer to fill with data elements to a predetermined level.

* * * * *